No. 665,768. Patented Jan. 8, 1901.
S. WOOLF & J. C. IRWIN.
LUBRICATING JOURNAL.
(Application filed May 12, 1900.)
(No Model.)
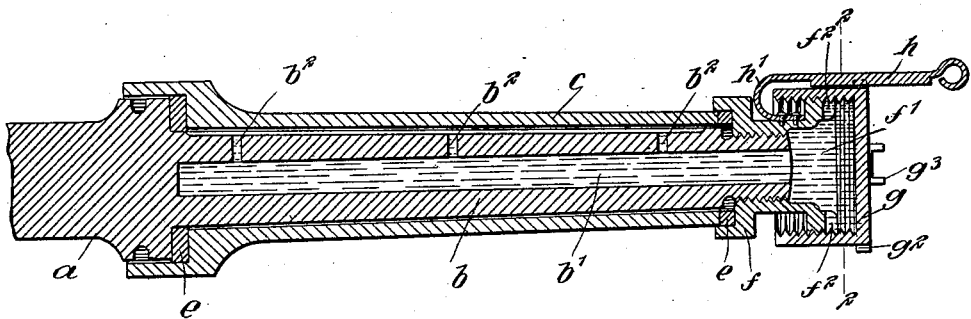
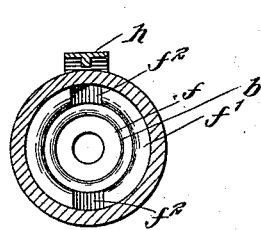 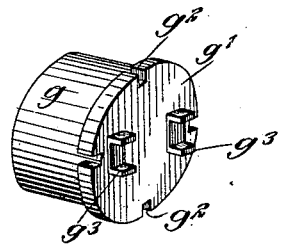
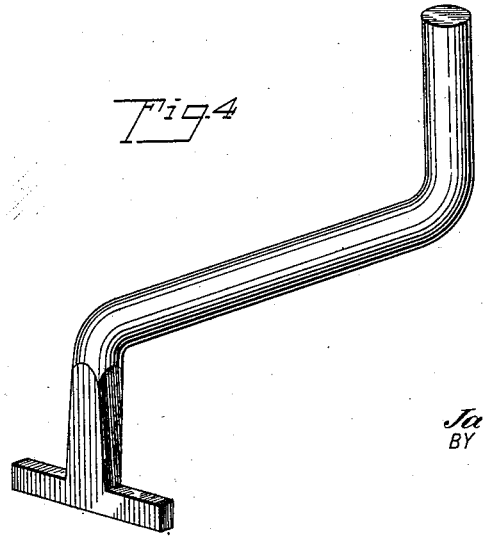
WITNESSES:
J. A. Brophy
J. B. Owens
INVENTORS
Sidney Woolf,
James C. Irwin.
BY
ATTORNEYS
THE NORRIS PETERS CO., PHOTO-LITHO., WASHINGTON, D. C.

UNITED STATES PATENT OFFICE.

SIDNEY WOOLF AND JAMES C. IRWIN, OF LYNCH, NEBRASKA.

LUBRICATING-JOURNAL.

SPECIFICATION forming part of Letters Patent No. 665,768, dated January 8, 1901.

Application filed May 12, 1900. Serial No. 16,531. (No model.)

*To all whom it may concern:*

Be it known that we, SIDNEY WOOLF and JAMES C. IRWIN, citizens of the United States, and residents of Lynch, in the county of Boyd and State of Nebraska, have invented a new and Improved Lubricating-Journal, of which the following is a full, clear, and exact description.

The purpose of this invention is to provide a journal especially for the axles of vehicles, which journal is fitted with means for effectively lubricating the journal without necessitating the removal of the wheel or even the removal or adjustment of the axle-nut.

This specification is the disclosure of one form of the invention, while the claims define the actual scope thereof.

Reference is to be had to the accompanying drawings, forming a part of this specification, in which similar characters of reference indicate corresponding parts in all the views.

Figure 1 is a longitudinal section of the invention. Fig. 2 is a transverse section on the line 2 2 of Fig. 1. Fig. 3 is a perspective view of the cap, and Fig. 4 is a perspective view of a wrench which may be conveniently employed in connection with our invention.

The axle $a$ has the journal $b$ thereon in the usual manner, and this journal is formed with a longitudinally-disposed cavity $b'$, running throughout the length thereof and having communication with the outer side of the axle by means of upwardly-extending ducts $b^2$, which are here shown to be three in number. The wheel is adapted to fit over the journal in the usual manner, ($c$ in the drawings representing the bushing of the wheel-hub,) and washers $e$ are provided, all of which will be understood. A nut $f$ is screwed on the end of the journal $b$ to hold the wheel in place, and this nut is hollow throughout its length and has a threaded extension $f'$ projecting outward from the journal and carrying a cap $g$, which is screwed over the flange of the extension $f'$ of the nut. The extension $f'$ of the nut is formed with oppositely-disposed recesses $f^2$ to be engaged by a wrench, spanner, or the like, whereby to operate the nut. The cap $g$ has a peripheral flange $g'$ formed with notches $g^2$, and these notches are adapted to receive a spring-dog $h$, which has its shank $h'$ fastened to the nut $f$ inward of the extension $f'$ thereof, so that the dog $h$ projects outwardly alongside of the cap $g$. By the engagement of the dog $h$ with the walls of the recesses $g^2$ of the flange $g'$ the cap $g$ may be held in any desired position. The front face of the cap is formed with pairs of lugs $g^3$, which are also adapted to be engaged by a wrench to facilitate turning the cap. When the cap is to be turned, the dog $h$ should be moved by manual force out of engagement with the cap.

In the use of the invention the cavity $b'$ of the journal $b$ and the interior of the part $f'$ of the nut $f$ should be filled with oil, preferably the usual heavy lubricating oil or grease, and the cap $g$ should also be filled and screwed on the flange of the extension $f'$ of the nut $f$. It is clear that by screwing up the nut the oil will be forced through the cavity $b'$ and out by the passages $b^2$. When the cap is first placed in position, it will be screwed up just enough to hold it in position, thus retaining the greater part of the oil within the cap, and then as the oil is used up around the journal the cap may be screwed up from time to time to replenish the supply of lubricant. It is pointed out that this operation may be performed at any time without removing the nut $f$ or in any way disturbing the wheel, a partial turn of the cap on the nut $f$ being sufficient to supply the necessary amount of lubricant.

Having thus described our invention, we claim as new and desire to secure by Letters Patent—

1. The combination of a journal having a cavity therein, the cavity opening at the outer end of the journal and also having an opening or openings leading to the side of the journal to lubricate the wheel, a hollow nut fitted on the end of the journal to hold the wheel in place, a cap adjustably fitted on the nut and adapted to contain a lubricant, and a spring-dog carried by the nut and engaging the cap to hold the same at the desired adjustment.

2. The combination of a journal having a cavity therein and having an opening or openings communicating with the side of the journal, a hollow nut screwed on the end of the journal to hold the wheel in place, the nut having a hollow outward extension formed with a flange, a cap screwed on the flange of the nut and carried thereby, and a spring-dog carried by the nut and extending alongside of the cap to hold the same at the desired adjustment.

3. The combination of a hollow journal having an opening in its outer end and having an opening in the side, a hollow nut mounted on the end of the journal and having an outwardly-turned screw-threaded portion, and a cap inclosing the outer end of the nut and screwing on the threaded portion of the same, the cap serving to contain a lubricant.

In testimony whereof we have signed our names to this specification in the presence of two subscribing witnesses.

SIDNEY WOOLF.
JAMES C. IRWIN.

Witnesses:
　CALVIN C. IRWIN,
　JOHN M. McGINITIE.